United States Patent [19]

Govind

[11] Patent Number: 4,681,661
[45] Date of Patent: Jul. 21, 1987

[54] DUAL DISTILLATION COLUMNS

[76] Inventor: Rakesh Govind, 10409 Stone Ct., Cincinnati, Ohio 45242

[21] Appl. No.: 657,731

[22] Filed: Oct. 9, 1984

Related U.S. Application Data

[63] Continuation-in-part of Ser. No. 541,991, Oct. 14, 1983, abandoned.

[51] Int. Cl.⁴ .............................................. B01D 3/26
[52] U.S. Cl. ..................... 202/154; 202/158; 203/25
[58] Field of Search .............. 202/158, 159, 154, 153; 203/24–26, 100, 72–85, DIG. 9; 261/114 R; 62/34; 196/100, 110, 120, 134

[56] References Cited

U.S. PATENT DOCUMENTS

| | | | |
|---|---|---|---|
| 1,086,452 | 2/1914 | Golodetz | 202/158 |
| 1,257,470 | 2/1918 | Filippo et al. | 202/158 |
| 2,070,100 | 2/1937 | Twomey | 202/158 |
| 3,189,531 | 6/1965 | Hack et al. | 202/154 |
| 3,412,016 | 11/1968 | Graven | 203/DIG. 9 |
| 3,844,898 | 10/1974 | DeGraff | 202/154 |
| 3,959,085 | 5/1976 | DeGraff | 202/154 |
| 4,025,398 | 5/1977 | Haselden | 202/154 |
| 4,234,391 | 11/1980 | Seader | 202/158 |

Primary Examiner—Wilbur Bascomb
Attorney, Agent, or Firm—Wood, Herron & Evans

[57] ABSTRACT

Dual interrelated distillation columns are disclosed wherein the heat for a first column is transferred by thermal conduction through a common wall or surface to a second column to increase efficiency and decrease waste of energy. In one embodiment, the first heat generating column is a cylindrical column, and the second column is an annular column concentric to the first column. This concentric arrangement permits the heat generated in the first column to flow outwardly into the second column, thereby improving its efficiency and reducing the heat loss. Typically, the inner first column is a high pressure rectifying column, and the outer concentric column is a stripping column. In an alternate embodiment, the inner column can simply be a portion of a high pressure distillation process, and the outer column is a portion of a lower pressure distillation column. In alternate embodiments, the rectifying apparatus can assume a variety of shapes such as a plurality of packed tubes which extend through the stripping column or a corrugated configuration or rectangular configuration as desired.

2 Claims, 4 Drawing Figures

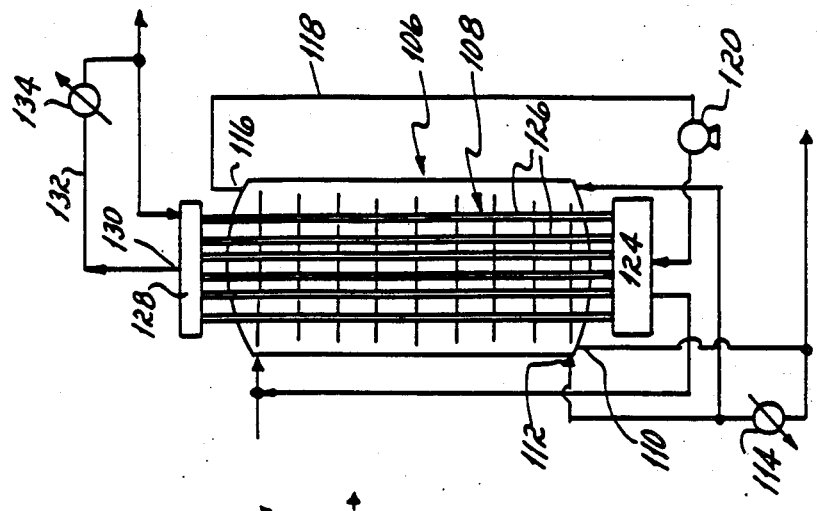
FIGURE 4
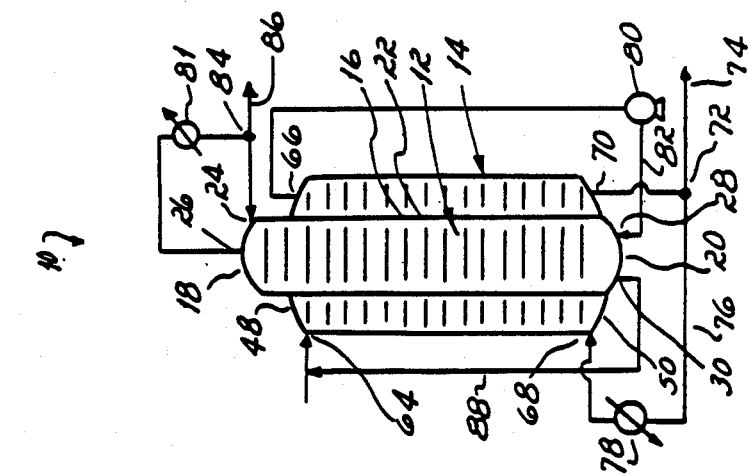
FIGURE 3
FIGURE 2

DUAL DISTILLATION COLUMNS

RELATED APPLICATIONS

This application is a continuation-in-part of my copending application entitled "Distillation Column", Ser. No. 541,991, filed Oct. 14, 1983 now abandoned.

BACKGROUND OF THE INVENTION

The distillation process requires more energy than any other single operation in the entire chemical industry. Despite this, distillation is still, in many applications, a preferred separation method. In many situations, distillation is the only means to separate two or more combined materials.

Distillation involves stripping and rectifying, both typically conducted in the same tower at different heights along the tower. In the lower portion of the tower below the feed tray, a mixture is heated causing it to boil. The generated vapors pass upwardly through the column. At the feed tray, the same mixture in liquid form is injected into the column. This liquid flows downwardly, contacting the rising vapors. The vapors preferentially strip the more volatile components of the mixture from the downwardly flowing liquid. Vapors continue to rise upwardly into the upper rectifying portion of the tower and pass completely out of the column. A portion of these vapors are condensed and injected at the top into the column at its highest point. This condensed liquid contacts the upwardly flowing vapors causing the less volatile material to condense.

The separation occurring in the stripping section is effected by the vaporization of the more volatile component. The separation in the rectifying section is caused by the condensation of the less volatile material. As such, in order to improve efficiency, it would be desirable to heat the stripping section and to cool the rectifying section. To make the separation most efficient, it is desirable to actually place heat exchangers within the distillation column. At the upper rectifying sections, cooling units should be used. At the lower stripping sections, heaters should be used.

For separation purposes, this is very efficient; economically, this is very inefficient. The capital cost for providing multiple heat exchangers in very long columns makes this impractical.

A recent development has been to use split columns, separate stripping and rectifying columns. In such systems, the gas evolved from the stripping column is directed to the rectifier column, and the liquid condensate from the rectifier is returned to the upper portion of the stripping column. Such units have been further modified by using heat exchangers between the stripping column and the rectifier. Thus, the excess heat evolved in the rectifier is transferred to the stripping column to provide the additional needed heat for the stripping operation. Further unwanted heat in the rectifier is removed. Such an apparatus is disclosed in Haselden U.S. Pat. No. 4,025,398.

Again, the problem with such a system is that it is extremely complex and very capital intensive. The heat exchangers require a large deal of capital expenditure and furthermore are not completely efficient. Further, gas liquid contact within the column is decreased because of the interferences caused by the heat exchangers.

SUMMARY OF THE INVENTION

Applicant's invention is premised upon the realization that in a dual column system, the capital cost is substantially reduced and heat transfer efficiency improved dramatically by providing a first separation apparatus or column in direct thermal conductive contact with a second column whereby heat is transferred from one column to the other by thermal conduction through a common wall. Preferably, a first column is encased within a second column with the interior column being a rectifier, and the exterior column being a stripping column, preferably an annular column. Such an apparatus does not require the expensive coils required for the heat exchanger in Haselden. Further, the heat exchange approaches 100% efficiency because the heat from the rectifier has nowhere to go except to the stripping column. Since the stripping column is at a lower pressure and lower temperature than the rectifier column, the heat will naturally tend to go to the stripping column where it will improve the efficiency of the stripping column.

This concentric design can be employed where two separate distillation operations are conducted in two separate towers and where one of the columns operates at a lower temperature pressure than the other. The rectifying section of the higher temperature column is located within the stripping section of the lower temperature column.

Further, the present invention provides greater efficiency because the annular stripping column is substantially more effective than the typical cylindrical column.

The invention and its advantages will be more fully appreciated in light of the following detailed descriptions and drawings in which:

BRIEF DESCRIPTION OF THE DRAWINGS

FIG. 2 is a cross section diagrammatical view of the stripping and rectifying sections of the present invention detailing the trays;

FIG. 3 is a diagrammatic depiction of an alternate embodiment of the present invention; and FIG. 4 is a diagrammatic depiction of a second alternate embodiment of the present invention.

DETAILED DESCRIPTION

Figure 1:
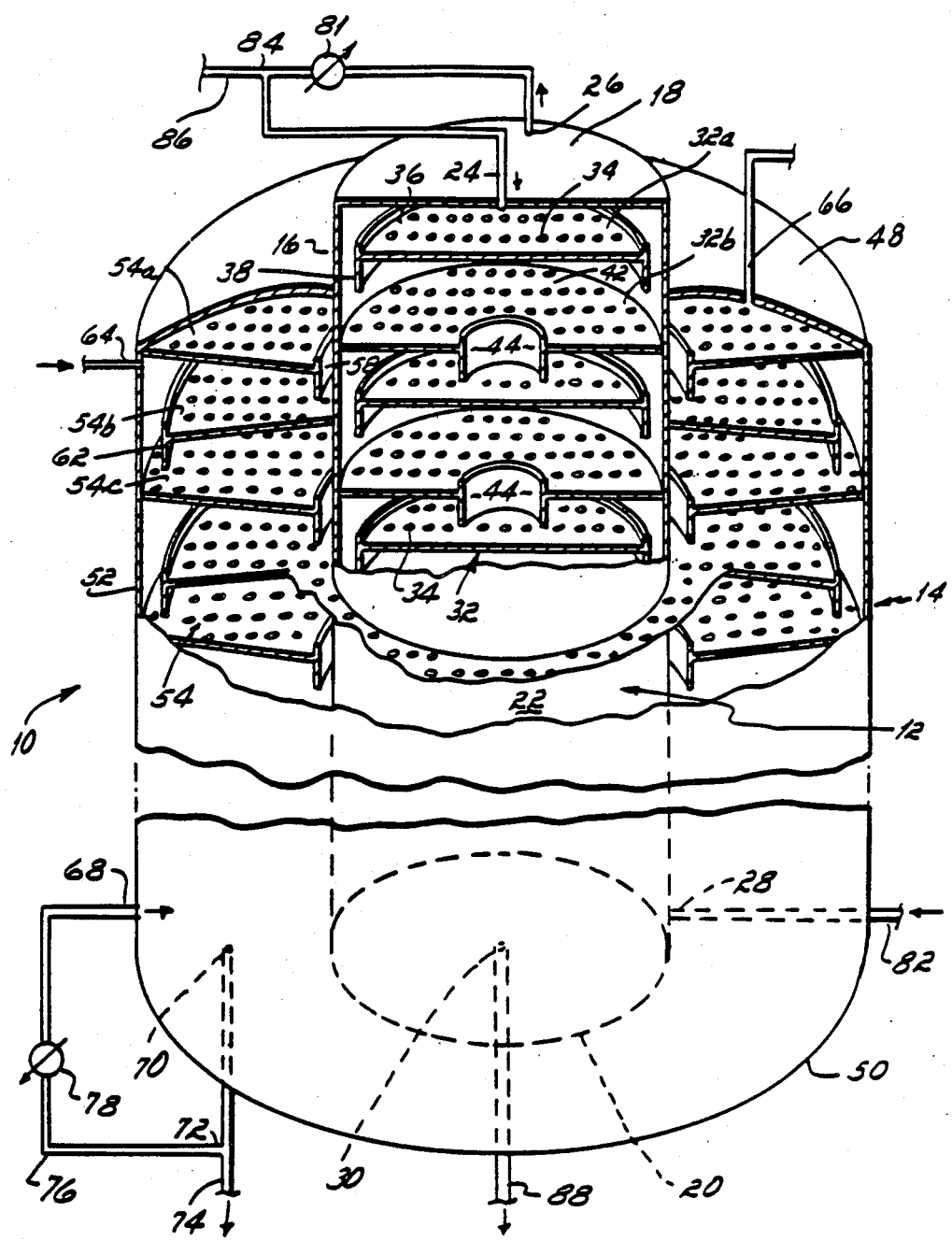
FIG. 1 is a schematic diagram of the present invention.

As shown in FIG. 1, there is a distillation apparatus 10 including an inner rectifying column 12 and a concentric annular stripping column 14. The rectifying column is of typical design including an outer casing 16, including a top 18, a bottom 20 and a cylindrical outer wall 22.

The rectifying column 12 includes an upper liquid inlet 24 directing condensed liquid to the center of the column. Further, the column 12 also includes a distillate vapor outlet 26 extending from the top 18. The bottom 20 of column 12 includes a vapor inlet 28 and a liquid outlet 30. The interior of the column 12 is filled with some type of packing. As shown in FIG. 1, a plurality of foraminous vapor liquid contact plates 32 fill the column. Perforations 34, through these plates, permit gas flow and facilitate gas liquid contact.

Alternate plates are designed to direct the liquid flow over the foraminated surface of the plates, and either towards the center of the column or towards the outer wall 22 of the column. For example, a first plate 32a includes a circular foraminated top surface 36 with a downwardly extending annular peripheral flange 38. Plate 32a and flange 38 are separated from the rectifier column wall 22, permitting fluid to flow between flange 38 and wall 22 down to the next lower plate 32b. Plate 32b is a downwardly sloped annular foraminated surface 42 with a central opening 44. Plate 32b directs liquid falling from plate 32a across surface 42 through opening 44 and to the next lower plate 32c. Plate 32c is substantially identical to circulate plate 32a. The plates alternate between circular and annular foraminated plates providing a flow path alternately towards or away from the wall 22.

The stripping column 14 is annular in configuration having an inner wall, an outer wall 52 connected by top 48 and bottom 50. Preferably, outer wall 22 of the rectifying column serves as the inner wall of the stripping column. Alternately, the stripping column could have a separate inner wall which surrounds and contacts the outer wall of the rectifying section. This would facilitate separation of the rectifying and stripping columns should this be desired.

Like the rectifying section, the stripping column includes a gas liquid contact area. As was the case with the stripping column, this gas liquid contact area comprises a plurality of foraminated plates 54 which alternately direct downward flowing liquid either towards outer wall 52 or toward the wall 22.

As shown in FIG. 1, a first plate 54a is an annular foraminated plate welded to the outer wall 52 and sloping downwardly towards wall 22. It includes an inner peripheral flange 58. A next lower plate 54b is likewise a foraminated plate which is welded to wall 22. It is sloped downwardly towards the outer wall 52 and ends in an outer annular flange 62. These plates alternate configuration down the stripping column. Directing fluid flow against inner wall 22 promotes heat exchange between the inner and outer columns.

The stripping column, as with the case with most stripping columns, includes a mixture or feed inlet 64, a distillate outlet 66 extending from the top 48 of the stripping column, a vapor inlet 68 entering a lower portion of the column, and a bottoms outlet 70 extending from the bottom 50 of the column 14.

The distillation apparatus described can be used in a joint operation wherein the vapor removed from the stripping column is fed through the rectifying column, and the liquid removed from the rectifying column is fed back to the stripping column. Or alternately, the internal rectifying section could be operated totally separately from the annular stripping column, both having separate feeds and separate products.

The present invention wherein the stripping and rectifying columns are used jointly to separate components from one feed is diagrammatically detailed in FIG. 2. In this operation, the unprocessed feed enters the stripping section 14 through inlet 64 as a liquid vapor or mixture of vapor and liquid, and passes downwardly through the columns. Liquid is withdrawn from the bottom outlet 70 and is directed at a junction 72 either through line 74 to a collector (not shown) or through line 76 to a reboiler 78. Reboiler 78 heats this liquid until boiling, directing the generated vapor into the bottom of the stripping section at vapor inlet 68. This vapor acts to strip the more volatile components from the downflowing feed.

Vapor stripped from the downflowing feed is removed from the stripping column 14 at outlet 66 and is directed to a compressor 80 which compresses the vapor and forces it via line 82 into the inlet 28 in the bottom 20 of the rectifying section 12.

Condensed distillate is directed via inlet 24 into the rectifying section where it flows downwardly contacting the upwardly flowing vapors injected through vapor inlet 28. The rectified vapors exit the rectifying section through distillate outlet 26 where it passes to a condenser 81. Condenser 81 condenses the distillate from the rectifying column, directing it to a junction 84 which splits the condensed liquid directing a portion towards the inlet 24 and the remaining portion to a collection station via line 86.

Liquid passing from the rectifier through outlet 30 is directed via line 88 back to the feed for the stripping section. In this operation, the rectifying column is operated at a higher pressure and higher temperature than the stripping column. The overall efficiency of the rectifier is improved because the stripping section in thermal contact with the exterior wall of the rectifying section draws heat by conduction from the rectifier. Since there is a common surface between the inner column and the outer column, heat is transferred from one column to the second column by conduction through this common wall. The stripping section is more efficiently operated because the heat absorbed from rectifier reduces the amount of heat required from the reboiler. Thus, the energy taken from the rectifier directly reduces the energy required to activate or run the reboiler.

The biggest problem with this method is that the joint operation of the stripping and rectifying columns requires the use of a compressor. Although compressors per se are not expensive, they tend to fail easily and end up being the weak link in the flow diagram. As shown in FIG. 3, the need for a compressor can be overcome. In this embodiment, a low pressure or temperature distillation apparatus 89 and a higher pressure or temperature distillation apparatus 90 are used together to take advantage of the present invention. In the drawings, FIG. 3, the high pressure apparatus 90 is shown in broken lines to distinguish the two apparatus. The low pressure distillation apparatus 89 includes a cylindrical rectifying section 92 in communication or on top of an annular stripping section 94. The high pressure distillation apparatus 90 includes a cylindrical rectifying section 96 and a cylindrical stripping section 98. Since the low pressure annular stripping section 94 surrounds and is concentric to the high pressure rectifying section 96, the thermodynamic efficiency of the present invention is taken advantage of, i.e., heat is conducted through a common surface from one rectifying section 96 into a concentric annular stripping section 94. In this particular embodiment, since the rectifying and stripping sections of both distillation apparatuses 89 and 90 are combined together, i.e., neither column is split, there is no need to employ a compressor.

As shown in this embodiment, there are two separate feeds, 100 and 102, which can potentially be feeding the same raw material mixture or a totally different mixture to be separated.

In a second alternate embodiment shown in FIG. 4, the rectifying column of FIGS. 1 and 2 is replaced by packed tube bundle. In this embodiment, there is a stripping column 106 having feed, a bottom outlet 110 and a vapor inlet 112 directed from reboiler 114. A distilled vapor outlet 116 directs distilled vapor via line 118 to compressor 120 which directs the compressed vapor into a rectifier 108. Rectifier 108 includes a bottom plenum 124 which communicates with a plurality of packed tubes 126 which extend through the interior of column 106. The interior of the tubes are packed with, for example, ceramic beads or glass. If the tubes are wide enough, they could also be packed with normal gas liquid contact trays. Tubes 126 extend upwardly to an exhaust manifold 128 which includes a distillate outlet 130 leading via line 132 to a condenser 134. Condenser 134 condenses the distillate vapor and directs a portion of the condensed liquid back into the manifold 128.

Again, the advantages of the present invention are realized in this embodiment since the heat from the rectifying section is transferred by conduction through the walls of the tubes into the stripping section. This embodiment would be preferred when additional heat transfer is required from the rectifying section to the stripping section. The tube bundle arrangement simply provides more thermally conductive contact area within the stripping section.

There are several distinct advantages to the design of the present invention. These include increased thermodynamic efficiency because the unwanted heat from the rectifier is removed, thereby improving its separation efficiency. Further needed energy is transferred to the stripping section improving its separation efficiency. Further, there is lower energy consumption because the reboiler in the stripping section can be operated at a lower temperature since additional heat is added along the stripping section. This design is also more compact, allowing the overall height of the distillation apparatus to be at least cut in half.

An ancillary advantage is the tray efficiency in the annular stripping section. The annular tray design itself provides better gas liquid contact because all of the liquid must flow back and forth between the inner and outer wall of the stripping column and across the entire gas liquid contact area of the plate.

The tray designs of the inner rectifying section and the outer stripping section are both cooperatively designed to maximize heat exchange at the common wall 22. Both tray designs direct the flow of liquid towards this wall, providing for efficient heat transfer.

The concentric design of the distillation apparatus of the present invention provides these advantages and can be used in a vast number of situations where this heat transfer from one column to another column is desired. One of ordinary skill in the art will easily appreciate the vast number of different configurations the columns can assume to provide direct heat conduction from the high temperature to the low temperature apparatus. The inner column can assume various shapes such as corrugated or flower petal configuration. It could have a rectangular configuration where the interior column is actually a plurality of packed tubes. The tubes could be used for different separations with different materials. Further, the higher temperature or pressure column or apparatus does not have to be located entirely within lower pressure or temperature column. The two apparatuses must be in direct conductive thermal contact, i.e., have a common wall or have separate walls physically contacting each other.

Accordingly, applicant intends to be bound only by the claims in which, I claim:

1. A distillation apparatus adapted to effect separation of component materials of a first and a second mixture and maintain said mixtures separate comprising a first distillation column comprising:
   a first upper rectifying section and a first lower stripping section;
   a first feed inlet into said first distillation column between said first rectifying section and said first stripping section;
   a first outlet from said first rectifying section;
   a second distillation column comprising a second upper rectifying section and a second lower stripping section;
   a second feed inlet into said second distillation column between said second upper rectifying section and said second lower stripping section;
   a second outlet from said second rectifying upper section;
   wherein the first lower stripping section of said first distillation column surrounds and is in thermal contact with said second upper rectifying section of said second distillation column, and first lower stripping section of said first distillation column and said second upper rectifying section of said second distillation column having a common cylindrical wall, said second upper rectifying section having a top wall, said cylindrical wall and said top wall separating said second upper rectifying section from said first lower stripping section thereby permitting said second upper rectifying section of said second column to be maintained at a higher pressure than said first lower stripping section of said first column without a compressor.

2. The apparatus claimed in claim 1 wherein said lower stripping section of said first distillation column is annular.

* * * * *